Oct. 11, 1938.  H. DANNER  2,133,191

DEVICE FOR DRESSING GRINDING WHEELS

Filed Aug. 20, 1937  2 Sheets-Sheet 1

Hermann Danner.
Inventor
by
J. E. Hutchinson Jr.
Attorney

Oct. 11, 1938.   H. DANNER   2,133,191
DEVICE FOR DRESSING GRINDING WHEELS
Filed Aug. 20, 1937   2 Sheets-Sheet 2
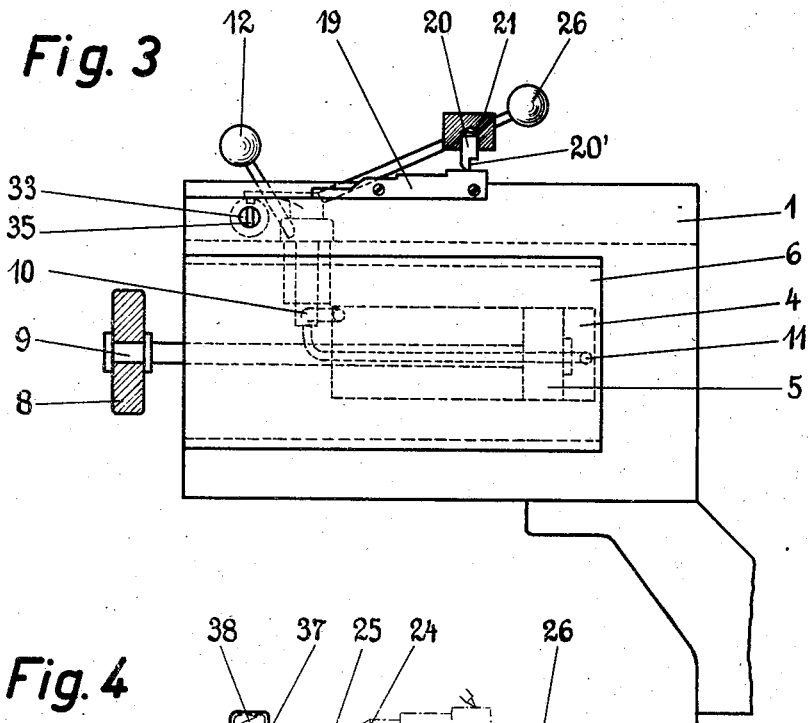
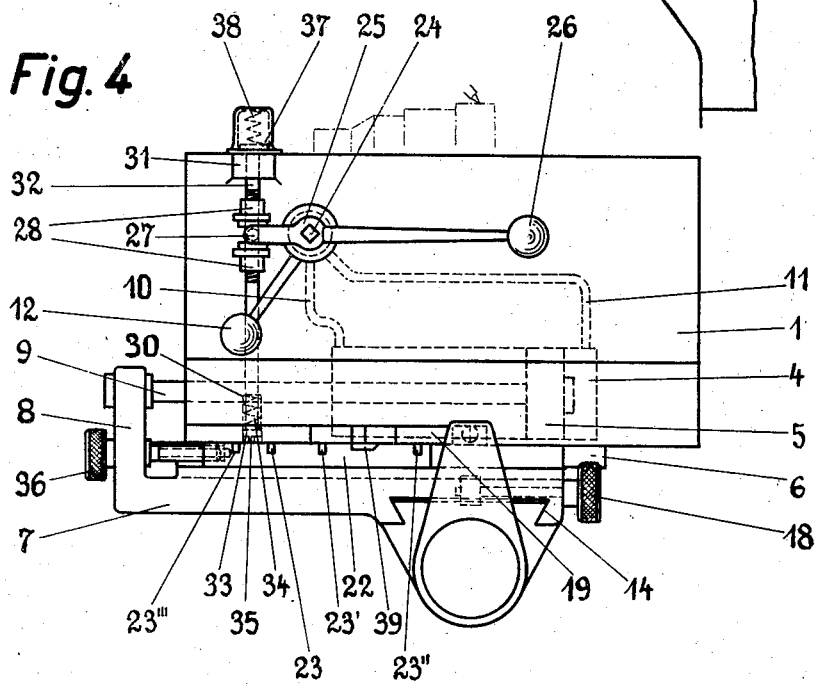
Hermann Danner.
Inventor
by
J. E. Hutchinson Jr.
Attorney Patented Oct. 11, 1938

2,133,191

UNITED STATES PATENT OFFICE 2,133,191

DEVICE FOR DRESSING GRINDING WHEELS

Hermann Danner, Stuttgart, Germany, assignor to the firm Fortuna-Werke Spezialmaschinenfabrik Aktiengesellschaft, Stuttgart-Cannstatt, Germany Application August 20, 1937, Serial No. 160,183 In Germany April 6, 1936

12 Claims. (Cl. 125—11)

This invention relates to a machine or device for dressing stepped shouldered profile grinding wheels, wherein hydraulic drive mechanism is provided for efficiently operating the machine in accordance with the so-called "copying" method.

In dressing grinding wheels of the shouldered profile type, and by means of a diamond tool while is guided in its operation by means of a template, care must be exercized in lowering the diamond tool from one shouldered surface to the next lower shouldered surface of the grinding wheel, and this in order that said operation may be accomplished accurately and without shock, thus avoiding damage or injury to either the dressing tool or the grinding wheel. For this reason dressing machines or devices have heretofore been constructed exclusively for hand operation, and this in turn leads to defects in the accuracy of the work produced, of which the most serious is that the feed of the diamond tool over the operating surface of the grinding wheel, (which is usually accomplished by means of a hand operated screw drive), is not of sufficient uniformity and with any degree of exactness. The reason for this is that the operator cannot concentrate his attention solely upon maintaining a certain speed of feed, and in addition to this, said operator must exercise utmost care at the points where the shoulders are formed in order to alter the position of the diamond tool at the proper moment, thus resulting in almost unavoidably bringing about a noticeable reduction of the prescribed feed velocity of the tool on approaching these shouldered points, and the proper and uniform setting of the diamond tool to the new shouldered surface.

According to the present invention, these defects are eliminated by feeding the diamond tool forward by means of a hydraulic drive, which is automatically controlled by mechanical means for stopping the feeding movement of said diamond tool in an effective manner when it arrives at a predetermined step or shoulder of the profile to be operated upon, and wherein the mechanical means may be so adjusted and arranged as to control the operation of the machine for use in connection with grinding wheels of varying profiles.

The invention comprises a template for guiding the dressing tool in association with a control member or rail for the hydraulic drive of the dressing tool, said control member being connected to the slide carrying the dressing tool and effecting in association with other mechanism the interruption of the supply of fluid pressure to the hydraulic slide drive mechanism during the constant feeding operation of the dressing tool, thus stopping the feeding movement of said dressing tool, in an efficient manner, and this when a suitably provided guide pin or member, associated with the dressing tool, reaches a shoulder of the template corresponding to the shoulder on the grinding wheel at the end of the grinding wheel surface just previously dressed.

In this arrangement, the operator sets the desired feed velocity of the diamond tool at the beginning of the dressing operation, and this feed velocity remains unchanged during the dressing operation of each shouldered surface, whereupon the diamond tool is stopped positively, with certainty and accuracy at the points where it is to be reset for the dressing of another shouldered surface. The operator has at his disposal any required amount of time for the resetting operation, and therefore may devote the necessary attention thereto. This dressing operation may be continued at the will of the operator and by means of a hand controlled lever for the resetting operation, whereupon the diamond tool again moves forward with the originally selected feeding speed to perform its dressing operation up to the next shoulder on the profile or to the end of the profile as the case may be.

Furthermore, the invention requires that the means for stopping the hydraulic drive be so constructed and arranged that said means shall be capable of altering the speed of the diamond tool in its movement in a direction parallel to the grinding wheel axis, and this in a positive manner and according to a predetermined plan to suit conditions. This embodiment of the invention is important in the case of profiles which at various points require the feeding movement of the diamond tool to be composed of two perpendicular components and without shouldered or step jumps, the condition being that the diamond tool shall treat all sections of the grinding wheel profile at the same speed. Accordingly, at the points where the diamond tool moves at an angle with respect to the grinding wheel axis, its speed must be reduced in the direction of said axis. This requirement is difficult to fulfill, and cannot be accomplished in a satisfactory manner by hand operating devices, but with a machine constructed in accordance with the present invention, this problem may be readily solved, whereby further remarkable improvement is achieved over existing methods.

An embodiment of the improved machine or device according to the present invention is illustrated by way of example in the accompanying drawings wherein:

Figure 3 is a front elevation thereof; and

Figure 4 is a top plan view of the dressing machine as shown in Fig. 3.

Figure 1:
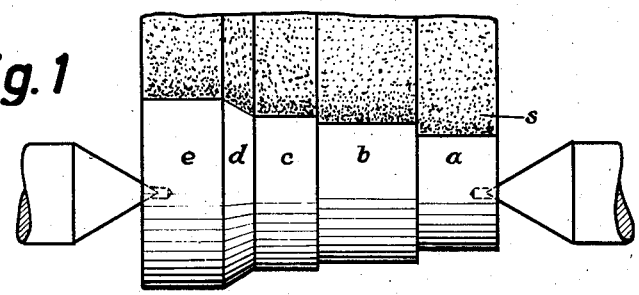
Figure 1 is a diagrammatic view of a piece of work of the type to be ground by a shouldered grinding wheel using the plunge cut method; and also illustrating in connection therewith the type of grinding wheel which is to be dressed.

The embodiment of this invention is based upon the conditions as illustrated in Figure 1, and wherein it is necessary to dress grinding wheels of the type used for grinding work having a number of shouldered portions, and this by the plunge cut method. In this Fig. 1 disclosure, a cylindrical part $a$ of the work having a comparatively small diameter is joined by a second cylindrical portion $b$ of slightly larger diameter which is followed by a third cylindrical portion $c$ of still larger diameter. Furthermore, a frustoconical portion $d$, increasing in diameter towards the left, leads to the last cylindrical portion $e$. These portions $a$, $b$ and $c$ are shouldered off at right angles with reference to one another as shown in Fig. 1. For grinding this type of work by the plunge cut method, i. e., by feeding the grinding wheel S radially toward the axis of the work, the surface of the grinding wheel with its individual adjacent surface portions, must have its diameter graduated accurately in accordance with the measurements when considering the diameter of the work, but in inverse relation thereto, the smallest diameter of the work corresponding to the largest diameter of the grinding wheel and vice versa.

It is, therefore, the essence of this invention to provide a machine or device which is capable of dressing profiles of grinding wheels of the type just referred to, and this machine comprises a block shaped frame 1 and a diamond tool holder 2, mounted on the frame so as to be slidable in two directions at right angles to each other. The frame 1 is fixed relatively to the grinding wheel, as for instance, on the upper part 3 of the grinding wheel slide or mounting. On the frame 1 is mounted a hydraulic drive 4, 5 for moving the diamond tool holder 2 over the working surface of the grinding wheel, and also mounted on said frame are the parts necessary for the control of said drive. The axis of the hydraulic drive 4, 5 and the front surface of the frame 1 are parallel to the axis of the grinding wheel. This frame has a horizontal dovetail guide 6, upon which the base slide 7 of the diamond tool holder moves. The slide 7 is connected by means of an arm 8 to the piston rod 9 of piston 5, which piston is adapted to reciprocate within the cylinder 4, to which cylinder liquid under pressure is supplied through conduits 10—11 for moving the piston in one direction or the other, according to the position of a hand operated reversing valve 12 as will be readily understood. The piston drive 4, 5 also includes a shut-off and control valve 13, operable by manually controlled means to be hereinafter described. This valve 13 is combined with the reversing valve 12 in the embodiment shown, and serves to control the speed of the feeding movement of the slide 7 which carries the tool holder.

It is to be noted that the front surface of the slide 7 is also formed as a dove-tail guide 14, disposed perpendicularly with reference to the guide 6. For sliding movement within this guide 14 is mounted the diamond tool holder 2, in which is disposed in the usual manner, the stock 16 with the diamond 17, said stock 16 being provided with a member 15 for fine adjustment of said tool. In the example shown (see Figs. 2 and 4) a self-locking rack and pinion mechanism 18 is provided for the rapid vertical reciprocable movement of the diamond tool holder 2 in the guide 14.

As previously mentioned, the diamond tool is set and controlled for the dressing of the various grinding wheel diameters or surfaces required, by means of a template 19 which is detachably secured to the upper front edge of the frame 1. Its freely exposed upper surface is an accurate replica of the desired profile of the working surface of the grinding wheel, and serves as a guide surface for the guide pin or member 20, which is carried by an arm 21 extending from the diamond tool holder 2. The pin 20 is shouldered as at 20' on one side of its free end and with its center plane perpendicular to the grinding wheel axis, the working edge of the diamond 17 being also located in said plane. With the surface 20' thus formed, the diamond tool holder 2 is set (and this prior to the lowering from one shoulder of the template 19 to the next lower shoulder) accurately to the plane of the template shoulder, and during lowering is held fast in said plane. According to the invention, this is effected by positively interrupting the transverse feeding movement of the diamond holder 2 (produced by the piston drive 4, 5), by mechanical means adjustable with the necessary accuracy, as soon as the guide pin 20 is in the correct position on the template 19.

Figure 2:
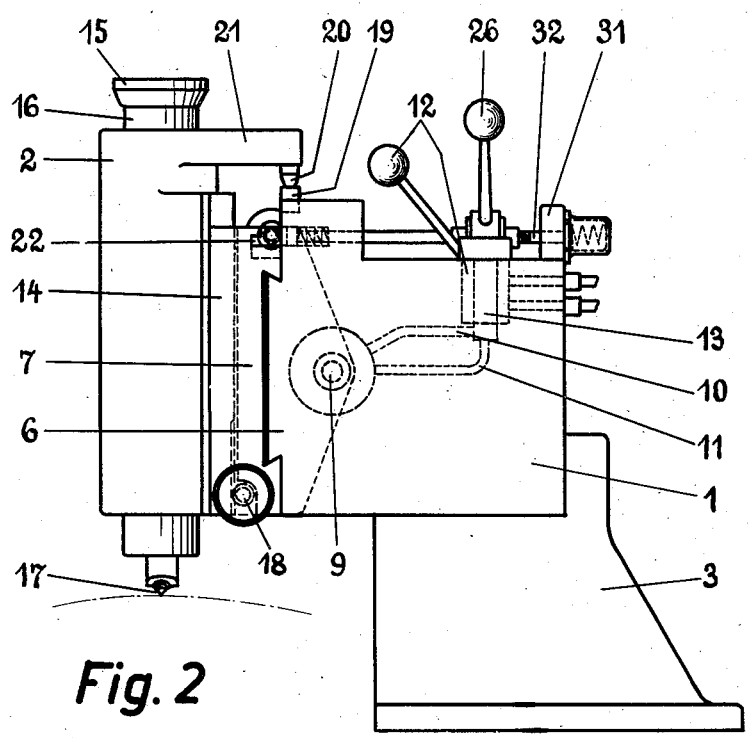
Figure 2 is a side elevation of the improved dressing machine.

In the embodiment of the invention as shown particularly in Figs. 2 and 4, a controlling member or rail 22 is mounted for the purposes intended in a slideway in the base slide 7 of the diamond tool holder 2 opposite the front surface of the frame 1, said rail having notches 23, 23', 23'', 23''', etc., corresponding in number to the shoulders of the template 19, which notches in association with other mechanism, serve for the control of the shut-off and control valve 13 in the following manner:

The valve spindle 24 of the valve 13 carries a two-armed lever 25, the arms of which are of unequal length. The longer arm 26 forms a handle for manipulating and operating the mechanism, while the shorter arm engages with a cylindrical pin 27 in a sleeve 28, which sleeve has screw threaded engagement as at 29 with a rod 32 slidable in guides 30, 31 perpendicularly arranged with respect to the controlling member or rail 22. The guide 30 near the front surface of the frame 1 is widened to form a cylindrical bore in which the rod 32 is guided by means of a collar 33 on said rod 32, the inner surface of which collar acts as a movable support for a compression spring 34, the other end of which spring abuts the bottom of the guide bore 30. The end of the rod 32 located in front of the collar 33 is formed as a tooth 35, adapted to fit in one of the notches 23, 23', 23'', 23''', etc. in the rail 22. The spring 34 maintains the rod 32 with the tooth 35 pressed against the rail 22, this tooth being projected in an outward direction, and according to its position with respect to the said rail, may be pressed against the edge thereof, or into one of the recesses 23, 23', 23'' and 23'''. As long as the tooth is in contact with the edge of the rail as just set forth, the valve 13 is in its open position. As will more clearly appear hereinafter, the passage area of the valve may be varied within definite limits by the adjustment of the sleeve 28 on the threaded portion 29 of the rod 32 and in this manner it is possible to set the speed of the slide 7 and with it that of the diamond tool along the surface of the grinding wheel, as may be desired. When the tooth 35 snaps into any one of the notches of the rail 22, the lever 25 is moved counter-clockwise, whereupon the valve 13 is closed and the slide 7 and its tool holder instantly stopped from further feeding movement.

It will be seen that for obtaining the desired control action, it is only necessary to set the rail 22 opposite the template 19 in such a manner that one of the notches 23, 23', etc. is directly opposite the tooth 35 on the rod 32, and this when the surface 20' of the guide pin 20 is positioned at the shoulder of the template 19 corresponding to the particular notch in question. To accomplish this end, a fine adjusting means is provided for the rail 22, and in the embodiment shown this means is in the form of an adjusting screw 36 which is suitably connected to the rail at one end thereof and serves to move the same backward and forward within its slideway.

After the automatic stopping of the slide 7, the operator may now move the diamond tool holder 2 freely and in a downward direction by means of the rack and pinion 18, until the guide member or pin 20 bears against the next lower shouldered surface of the template 19. The operator then moves the hand lever 26 in a clockwise direction until the rear end of the rod 32 abuts against a movable abutment 37 disposed in the bearing 31, and in this position of the rod 32, the tooth 35 is withdrawn to a slight extent beyond the edge of the rail 22, and furthermore, the valve 13 is again opened to permit further feeding movement of the slide 7 and its tool holder so that the tool may operate on the shouldered surface of the grinding wheel just selected. As will be readily understood, the rail 22 will be moved along with the slide 7 and after said rail has moved a slight distance, or in other words, when the previously engaged notch in said rail has moved beyond the tooth 35 so that the smooth edge of said rail is opposite said tooth, then the operator may release the lever 26, as the valve is now maintained in open position by the engagement of said tooth 35 with the smooth edge of the control rail 22. Thus the rod 32 is supported as before by the control rail, and as the feeding movement of the dressing tool progresses, said rod will be so supported until the next notch in the control rail is brought opposite the tooth 35, whereupon said tooth snaps into said notch, and the valve is moved to closed position to stop further feeding movement as above described.

It is also to be noted that the slide 7 may be stopped in the same manner at the completion of the dressing operation by the notch 23''. After said slide has been so stopped, the operator raises the diamond tool 2 with the aid of the rack and pinion drive 18 to the full height of the profile; sets the reversing valve 12 to proper position for reversing; and thereupon turns the hand lever 26 in a clockwise direction to move rod 32 into engagement with abutment 37 against the tension of spring 38 until the extreme position of the rod 32, in the direction in which it is moved, is reached. The valve 13 is thereby set to its full open position and the slide returns together with the diamond tool holder 2 and the control rail 22 with comparatively rapid speed to its initial position, which is conveniently determined by the abutment of the piston 4 against the right hand end of the cylinder 5, as will be readily understood. In this position the slide may be held by a notch 23''' in the rail 22, into which the tooth 35 enters when operator releases the hand lever 26 to prevent further operation of the hydraulic drive. After the diamond tool holder has been lowered where the guide pin or member again rests on the template 19, the device is ready for the next period of operation.

According to the invention a constant speed of the dressing diamond over all parts of the grinding wheel profile should be maintained with the aid of the hydraulic drive 4, 5. Therefore, provision must be made for the frusto-conical surface, with which the grinding wheel must act upon part $d$ of the work (to be passed over by the diamond during the dressing operation), and at the same speed as any of the cylindrical surfaces of the parts $a$, $b$, $c$ and $e$. This requires, as mentioned above, the reduction of the speed of the slide 7 in the direction of the guide 6 on the axial length of the part $d$, since on this stretch the diamond must be simultaneously moved in horizontal and vertical directions. The vertical displacement is effected by means of the rack and pinion drive 18. The speed reduction for the movement of the slide 7 on the guide 6 can be achieved with the means described by means of a notch 39, which is shallower than the other notches and thus, when the tooth 35 snaps into said notch, it effects merely throttling, but not complete closure of the valve 13. The extent of throttling follows from the condition that the speed of the slide 7 on its guide 6 within the range of the profile section $d$ must be reduced to $v \cdot \cos \alpha$ when $v$ is the speed of the diamond tool on the grinding wheel and $\alpha$ half of the top angle of the frusto-conical portion $d$. It is to be noted that the edge of the notch 39 which is located in the front, in the direction of movement of the slide 7, must be shouldered off at right angles, to initiate suddenly the change of speed when the guide pin 20 passes onto the incline, but that the exit or tail edge of the notch must be inclined so as to cause the tooth 35 to be positively lifted out of the notch 39.

The described method of speed regulation is also applicable to profiles, which include curved portions continually merging one into the other.

The fundamental principle of the invention is not affected by varying the construction of the guiding of the diamond tool holder 2 by means of the template 19. Instead of raising and lowering the diamond tool holder manually by means of the rack and pinion drive 18, an automatically operating hydraulic or mechanical device may be provided, which may be so fitted into the cycle of operations that the device is rendered thereby fully automatic. The changes in the directions of movement of the slide 7 may also be rendered positive in known manner by means of abutments cooperating with the reversing valve 12. The important point is that in all arrangements the diamond tool passes over from one shoulder diameter to the next lower one while the slide 7 is at standstill.

What I claim is:

1. A machine for dressing shouldered profiled grinding wheels, comprising a fixed frame, a template carried by said frame, a dressing tool holder mounted for movement upon said frame, a guiding member carried by said tool holder and in engagement with the template for guiding and controlling the tool holder and its dressing tool during the dressing operation, hydraulic mechanism for reciprocating said tool holder for feeding the tool over the work, and a control member also mounted on said tool holder and in cooperative relation with the hydraulic mechanism for stopping the feeding movement of said tool, said control member movable with said tool holder to permit the desired feeding movement of the tool and thereafter effecting interruption of the fluid pressure to said hydraulic mechanism when the guiding member reaches a predetermined point on the template.

2. In a machine according to claim 1, wherein a valve is provided in the hydraulic system for interrupting the supply of fluid pressure to said system at each profile shoulder of the grinding wheel and wherein said valve also controls the feed velocity of the dressing tool during the operating stroke of said tool.

3. In a machine of the character set forth according to claim 1, wherein the mechanism for stopping the feeding movement of the dressing tool at each profile shoulder, is released to permit restarting of the tool for another of the series of predetermined work operations during each complete stroke of the tool, and also released for the rapid return of the tool to its initial position after said complete stroke of the tool over the grinding wheel being dressed.

4. In a machine according to claim 1, wherein the control member is so formed that it operates to maintain the valve for the hydraulic mechanism in proper position to bring about constant and uniform feeding movement of the dressing tool with respect to the grinding wheel profile surface, and also for intermittent closing of the valve to permit accurate stopping of said feeding movement of the dressing tool when reaching a profile shoulder on the grinding wheel.

5. In a machine according to claim 1, wherein the control member operates a valve for stopping the feeding movement of said dressing tool holder when reaching a profile shoulder on the grinding wheel.

6. In a machine according to claim 1, wherein the control member may be adjusted in accordance with conditions surrounding any particular dressing operation.

7. In a machine according to claim 1, wherein the dressing tool holder may be adjusted and have movement in both vertical and horizontal directions for the purposes intended.

8. In a machine according to claim 1, wherein a combined reversing and shut-off or throttling valve is used for controlling the fluid pressure delivered to the hydraulic mechanism.

9. In a machine according to claim 1, wherein is provided adjustable mechanism in connection with a control valve for delivering fluid pressure to the hydraulic mechanism, and this for the purpose of controlling the feed velocity of the dressing tool during the operating stroke of said tool.

10. In a machine according to claim 1, wherein the control member or rail is adjustable with respect to the template and its cooperating tool holder guiding member for the purposes intended.

11. In a machine according to claim 1, wherein the control member is slidably mounted on the tool holder and capable of being moved in a direction in line with the feeding movement of the tool holder and also adapted to be held in any one of a number of adjusted positions thereon by means of an adjusting screw.

12. In a machine according to claim 1, wherein the control member cooperates with the hydraulic mechanism to throttle the same and reduce the feeding speed of the dressing tool when operating on grinding-wheels or other work having frusto-conical portions and before effecting complete interruption of the fluid pressure for stopping the feeding movement of the tool.

HERMANN DANNER.